UNITED STATES PATENT OFFICE 2,111,131

SODIUM SILICATE ADHESIVES

Arthur S. Weygandt, Cleveland Heights, Ohio, assignor, by mesne assignments, to E. I. du Pont de Nemours & Company, Wilmington, Del., a corporation of Delaware No Drawing. Application February 29, 1936, Serial No. 66,452

7 Claims. (Cl. 134—23.92)

This invention relates to processes for the production of improved sodium silicate adhesives, and is particularly directed to processes wherein a small amount of zinc oxide is dissolved in a sodium silicate solution at elevated pressures and temperatures.

It has already been proposed to improve sodium silicate adhesives by adding zinc oxide thereto, and it is known that such zinc oxide additions improve the resistance of sodium silicate adhesive films to moisture. The zinc oxide added to the silicate of soda was, for the most part, undissolved, and to secure the maximum advantage from zinc oxide in the usual mechanical mixture it has been found necessary to use as high as ten per cent of the zinc oxide on the weight of the sodium silicate solution.

Mechanical mixtures of silicate of soda and zinc oxide are now being used commercially in the manufacture of molded grinding wheels and molded refractory articles. The beneficial influence of zinc oxide in such mechanical mixtures is not obtained until the molded articles have been baked at temperatures of about 450° F.

I have found that small but highly effective amounts of zinc oxide may be dissolved in sodium silicate by effecting the dissolution at elevated temperatures and pressures. The resulting solutions of zinc oxide in sodium silicate can be handled, shipped, and used in the same manner as unmodified standard grades of sodium silicate solution. The beneficial effects of zinc oxide are obtained without the necessity of baking the adhesive film and without the waste of zinc oxide which accompanies the use of mechanical suspensions or dispersions. The procedure of this invention does not appreciably increase the cost of the sodium silicate solutions, and it leads to a product of very desirable character for certain purposes.

The sodium silicate solutions treated according to my invention are those customarily employed as adhesives and binders. Generally, the sodium silicate has an $SiO_2/Na_2O$ ratio of from about 1.5 to 4.0. More specifically, it is preferred to use about a 3.25 ratio sodium silicate solution.

The amount of zinc oxide to be dissolved in a sodium silicate solution will depend upon the character of the solution and its proposed use. For most purposes it is generally desirable to dissolve from about 0.1% to 5% of zinc oxide in sodium silicate solutions having an $SiO_2/Na_2O$ ratio of from about 1.5 to 4. More specifically, I prefer to dissolve from about 0.1 to 1% by weight of zinc oxide in silicate solutions which have a ratio of about 3.25.

The elevated temperatures and elevated pressures employed in dissolving zinc oxide in sodium silicate solutions according to my invention are ordinarily obtained by running live steam into an autoclave containing a suitable mixture of the silicate and zinc oxide. With this method of operation the steam temperature will be a function of the pressure in the autoclave because the temperature will rise until the pressure at which the steam condenses is reached.

To effect solution of zinc oxide in a sodium silicate solution, it is generally desirable to use live steam so that pressures from about 50 to 150 lbs. per sq. in. are developed. The corresponding temperatures will then range from about 298 to 366° F. More specifically, it is preferred to employ pressures from about 50 to 100 lbs. per sq. in. and temperatures from about 298 to 338° F.

While the use of steam to obtain the desired temperatures and pressure is a preferred method of operation, it will readily be understood that other methods of heating the solution and other methods of obtaining the desired pressures may be used. It will also be understood that temperatures other than those which correspond to the pressures obtained by the use of steam may be employed. In another method of operation, for instance, the autoclave may simply be heated, and the temperatures finally obtained will correspond to the boiling point of the solution rather than to the condensation point of steam at the prevailing pressures.

In order that the practice of my invention may be more fully understood, the following example is given:

Example

To a 41° Bé. solution of 3.25 ratio sodium silicate there was added 1% of zinc oxide by weight. The mixture was placed in a pressure autoclave and steam was admitted to bring the pressure to 100 lbs. per sq. in. The mixture was allowed to stand for one hour at 100 lbs. per sq. in. pressure and at the corresponding temperature, 338° F., after which time the solution was removed from the autoclave. The zinc oxide was apparently entirely dissolved, and the solution was homogeneous. Films of a sodium silicate adhesive made according to this example remained tacky for from 50% to 200% longer than unmodified sodium silicate adhesives of the same $SiO_2/Na_2O$ ratio. The dry adhesive films produced using the silicate solution of this example have a greater resistance to moisture and high humidity conditions than corresponding films of an unmodified silicate adhesive.

In commercial practice, it will ordinarily be found desirable to add the zinc oxide in the desired amounts to silicate glass and to dissolve the sodium silicate and the zinc oxide together in a pressure autoclave. According to this method of procedure, there is no additional work or time required in the production of the modified silicate adhesive herein described. It will be noted, however, that when relatively large amounts of zinc oxide are to be dissolved, the time required may be greater than that required to dissolve the silicate, in which event some small additional cost is involved in the process.

While I have described certain specific procedures in the foregoing, those skilled in the art will readily understand that the processes shown are susceptible to considerable modification without departing from the spirit of my invention.

I claim:

1. In a process for the production of a modified sodium silicate adhesive, the steps comprising adding zinc oxide to a sodium silicate solution and effecting dissolution of the zinc oxide by subjecting the mixture to a pressure between about 50 and 150 lbs. per sq. in. and a temperature between about 298 and 366° F.

2. In a process for the production of a modified sodium silicate adhesive, the steps comprising adding zinc oxide to a sodium silicate solution and effecting dissolution of the zinc oxide by subjecting the mixture to a pressure between about 50 and 100 lbs. per sq. in. and a temperature between about 298 and 338° F.

3. In a process for the production of a modified sodium silicate adhesive, the steps comprising adding zinc oxide to a sodium silicate solution which has an $SiO_2/Na_2O$ ratio from about 1.5 to 4.0, and effecting dissolution of the zinc oxide by subjecting the mixture to a pressure between about 50 and 150 lbs. per sq. in. and a temperature between about 298 and 366° F.

4. In a process for the production of a modified sodium silicate adhesive, the steps comprising adding about 0.1 to 1.0% by weight of zinc oxide to a sodium silicate solution, and effecting dissolution of the zinc oxide by subjecting the mixture to a pressure between about 50 and 150 lbs. per sq. in. and a temperature between about 298 and 366° F.

5. In a process for the production of a modified sodium silicate adhesive, the steps comprising adding about 0.1 to 1.0% by weight of zinc oxide to a sodium silicate solution which has an $SiO_2/Na_2O$ ratio from about 1.5 to 4.0, and effecting dissolution of the zinc oxide by subjecting the mixture to a pressure between about 50 and 150 lbs. per sq. in. and a temperature between about 298 and 366° F.

6. In a process for the production of a modified sodium silicate adhesive, the steps comprising adding about 0.1 to 1.0% by weight of zinc oxide to a sodium silicate solution which has an $SiO_2/Na_2O$ ratio of about 3.25, and effecting the dissolution of the zinc oxide by subjecting the mixture to a pressure between about 50 and 150 lbs. per sq. in. and a temperature between about 298 and 366° F.

7. In a process for the production of a modified sodium silicate adhesive, the steps comprising adding about 0.1 to 1.0 per cent by weight of zinc oxide to a sodium silicate solution and subjecting the mixture to an elevated temperature and pressure until a homogeneous product is obtained.

ARTHUR S. WEYGANDT.